US009588604B2

(12) United States Patent
Zheng et al.

(10) Patent No.: US 9,588,604 B2
(45) Date of Patent: Mar. 7, 2017

(54) SHARED EDGE FOR A DISPLAY ENVIRONMENT

(75) Inventors: Qixing Zheng, Bellevue, WA (US); Jesse Clay Satterfield, Seattle, WA (US); Matthew P. Duignan, Seattle, WA (US); Yaou Wei, Bellevue, WA (US); Jennifer Nan, Seattle, WA (US); Bret P. Anderson, Kirkland, WA (US); Joshua A. Clow, Bellevue, WA (US); Robert J. Jarrett, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 352 days.

(21) Appl. No.: 13/290,400

(22) Filed: Nov. 7, 2011

(65) Prior Publication Data

US 2013/0113703 A1 May 9, 2013

(51) Int. Cl.
*G06F 3/038* (2013.01)
*G06F 3/0481* (2013.01)
*G06F 3/14* (2006.01)

(52) U.S. Cl.
CPC .......... *G06F 3/038* (2013.01); *G06F 3/04812* (2013.01); *G06F 3/1423* (2013.01)

(58) Field of Classification Search
CPC ....... G06F 3/038; G06F 3/033; G06F 3/04812
USPC ........................................ 345/157, 156, 331
See application file for complete search history.

(56) References Cited

U.S. PATENT DOCUMENTS

| 5,748,189 A * | 5/1998 | Trueblood ..................... 715/755 |
| 5,786,805 A | 7/1998 | Barry |
| 6,018,571 A | 1/2000 | Langlois et al. |
| 6,542,148 B1 | 4/2003 | Tanaka et al. |
| 7,124,374 B1 | 10/2006 | Haken |
| 7,142,192 B2 | 11/2006 | De Waal |
| 7,385,584 B2 * | 6/2008 | Segre ............................ 345/156 |
| 8,473,654 B2 * | 6/2013 | Dickens et al. ................ 710/73 |
| 2005/0007351 A1 | 1/2005 | Fabrick, II |
| 2006/0038741 A1 | 2/2006 | Mori et al. |
| 2006/0143571 A1 | 6/2006 | Chan |

(Continued)

FOREIGN PATENT DOCUMENTS

| CN | 1761934 A | 4/2006 |
| CN | 1782966 A | 6/2006 |

(Continued)

OTHER PUBLICATIONS

"International Search Report", Mailed Date: Mar. 22, 2013, Application No. PCT/US2012/063625, Filed Date: Nov. 5, 2012, pp. 9.

(Continued)

*Primary Examiner* — Fred Tzeng
(74) *Attorney, Agent, or Firm* — Bryan Webster; Dan Choi; Micky Minhas

(57) ABSTRACT

A shared edge for a display environment is described. In one or more implementations, a display environment of a computing device that is implemented using a plurality of display devices is configured to include a shared edge defined through a described arrangement of at least two of the display devices in relation to each other. Responsive to an input that describes movement of a cursor across at least a portion of the shared edge, an element is displayed in the display environment.

19 Claims, 15 Drawing Sheets

(56) References Cited

U.S. PATENT DOCUMENTS

| | | |
|---|---|---|
| 2006/0271864 A1 | 11/2006 | Satterfield et al. |
| 2007/0028174 A1 | 2/2007 | Moore et al. |
| 2008/0168364 A1 | 7/2008 | Miller et al. |
| 2009/0259963 A1 | 10/2009 | Vyas et al. |

FOREIGN PATENT DOCUMENTS

| | | |
|---|---|---|
| CN | 101075174 A | 11/2007 |
| CN | 101078955 A | 11/2007 |
| CN | 101266608 A | 9/2008 |
| JP | A-1998260784 | 9/1998 |
| JP | U-0003084433 | 3/2002 |
| JP | A-2002287866 | 10/2002 |
| JP | 2006059251 | 3/2006 |
| JP | 2006302320 | 11/2006 |

OTHER PUBLICATIONS

Urban, John, "Five Free Tools for Multi-Monitor Computer Set-Ups", Retrieved at <<http://sixrevisions.com/tools/five-free-tools-for-multi-monitor-computer-set-ups/>>, Sep. 16, 2009, pp. 17.

Larkin, Erik, "Peek Into Minimized Windows With Visual Tooltip", Retrieved at <<http://www.pcworld.com/article/158534/peek_into_minimized_windows_with_visual_tooltip.html>>, Feb. 4, 2009, pp. 4.

"Show or hide the taskbar", Retrieved at <<http://windows.microsoft.com/en-IN/windows-vista/Show-or-hide-the-taskbar>>, Retrieved Date: Jun. 14, 2011, p. 1.

Phillips, Dusty et al., "Can Friction Improve Mouse-Based Text Selection?", *Dept. of Computer Science & Engineering*; York University, Toronto, Canada, (2009), 6 pages.

"First Office Action and Search Report Received for Chinese Patent Application No. 201210439857.4", Mailed Date: Oct. 10, 2014, 18 Pages.

Supplementary Search Report Issued in European Patent Application No. 12848722.0, Mailed Date: Oct. 27, 2015, 10 Pages.

"Foreign Office Action", CN Application No. 201210439857.4, May 27, 2015, 7 pages.

"How to auto-hide the Taskbar and how to change its placement on Windows 7", https://www.youtube.com/watch?v=gyHQ0W7KTOg, Apr. 12, 2010, 2 pages.

"How To: Dual Screen—Windows XP, VISTA & 7—YouTube", https://www.youtube.com/watch?v=yZTPVZeA6MU, Mar. 13, 2010, 3 pages.

"Supplementary European Search Report", EP Application No. 12848722.0, Jul. 3, 2015, 7 page.

"Ubuntu Linux 10.04 running Windows 7. Dual Monitors + Virtuelbox", https://www.youtube.com/watch?v=i1MWNh396Yg, Aug. 30, 2010, 2 pages.

Notice of Reason(s) for Rejection, Japanese Patent Application No. 2014-540191, Aug. 9, 2016, 10 pages.

\* cited by examiner

SHARED EDGE FOR A DISPLAY ENVIRONMENT

BACKGROUND

Users have access to ever increasing functionality that may be provided by computing devices. From browsers to word processors, spreadsheets, calendaring and email applications, and so on, a user may execute a wide number of applications at any one time to view information from these applications.

In order to increase the amount of information that is viewable at a particular time, a user may employ a plurality of display devices (e.g., monitors) that are communicatively coupled to a single computing device. In this way, a user increases an amount of area that is available to display data from the applications that are executed on the computing device. However, this increase in display area could also negatively affect traditional techniques for user interaction that were generally based on a single display device.

SUMMARY

A shared edge for a display environment is described. In one or more implementations, a display environment of a computing device that is implemented using a plurality of display devices is configured to include a shared edge defined through a described arrangement of at least two of the display devices in relation to each other. Responsive to an input that describes movement of a cursor across at least a portion of the shared edge, an element is displayed in the display environment.

In one or more implementations, a display environment is generated by a computing device for display using a plurality of display devices. The display environment includes a shared edge defined through a described arrangement of at least two of the display devices in relation to each other. The display environment also includes a portion defined in relation to the shared edge to support a first rate of movement of a cursor in relation to movement described by an input provided by a cursor control device, the first rate used for display of the cursor inside of the portion. The portion defined in relation to the shared edge is also usable to define a second rate of movement of a cursor in relation to movement described by an input provided by the cursor control device, the second rate being greater than the first rate and used for display of the cursor outside of the portion. Display of the cursor in the generated display environment on the plurality of display devices is managed by the computing device responsive to inputs received from the cursor control device.

In one or more implementations, one or more computer readable storage media comprise instructions stored thereon that, in response to execution by a computing device, causes the computing device to configure a display environment of an operating system executed by the computing device for implementation by a plurality of computing devices, the display environment including a shared edge defined through a described arrangement specified in settings of the operating system of at least two of the display devices in relation to each other, the operating system configured to cause display of a menu responsive to receipt of an input to cause a cursor to move across at least a portion of the shared edge.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
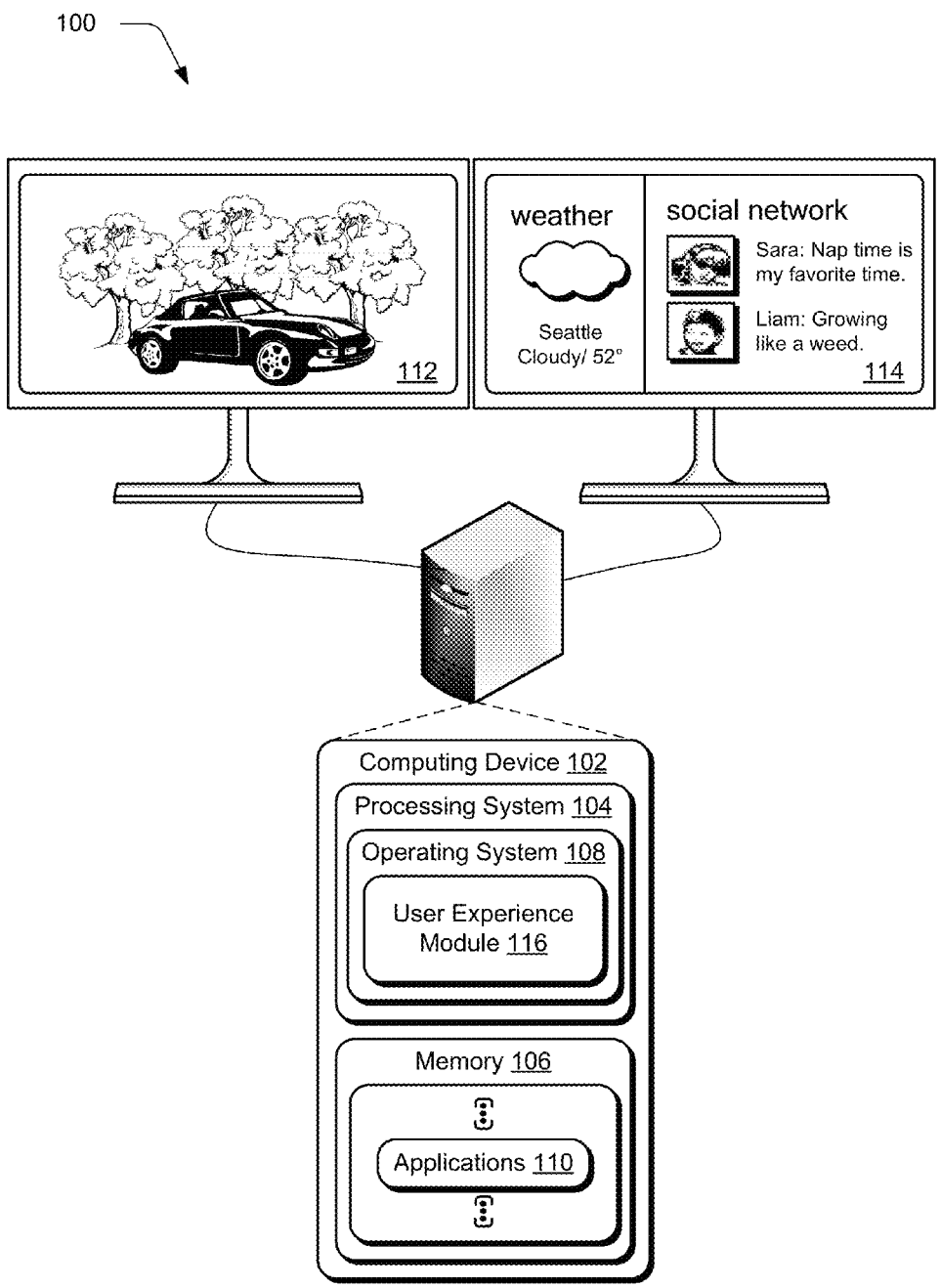
FIG. 1 is an illustration of an environment in an example implementation that is operable to implement the display environment techniques that involve a plurality of display devices that are described herein.

Users often employ a plurality of display devices when interacting with a single computing device in order to increase an amount of display area that is available to display data to the user. However, traditional display environments were often designed with a single display device in mind. Therefore, even though the display environment could be expanded across a plurality of display devices, this expansion could hinder interaction with functionality supported by the traditional display environment.

For example, a display environment may be configured support functionality invoked through interacting with an edge of the display environment, which is generally configured to coincide with a physical edge of a display device. However, when utilizing more than one display device, this edge functionality is typically not available for a shared edge between the display devices. Therefore, access to this functionality may involve a significant amount of movement of a cursor control device, which may make it less desirable in such an environment.

A shared edge for a display environment is described. In one or more implementations, techniques are described to support use of a shared edge in a display environment that involves multiple display devices. In one example, a shared edge is described in an arrangement of the display device as specified by one or more configuration settings, such as an arrangement specified for an operating system, application, or otherwise. A shared edge may then be defined using this arrangement which may be used to support a variety of different functionality, such as functionality configured to aide output of an element (e.g., a menu, docking of an application, and so on) in a user interface.

The user interface, for instance, may be configured to include a "sticky region" at the shared edge such that a rate of movement used to move a cursor responsive to movement described by a cursor control device (e.g., mouse, track pad, and so on) is decreased at or near the shared edge in comparison to movement made away from the edge. Thus, in this example, the movement near the edge may appear to employ friction at the shared edge and thus aide a user in interacting with the shared edge by "slowing down" the movement of the cursor. Further discussion of this instance may be found beginning in relation to FIG. 4 and corresponding procedures.

In another instance, the display environment may include a shared edge as before and one or more gates disposed adjacent to the shared edge. Therefore, as a user moves the cursor through the shared edge the element may be output. Further, the display of the element may remain while the cursor is between the one or more gates and the shared edge. Movement outside of this region may be used to cease display of the element. Thus, this technique may be used to expand a region defined by the shared edge that supports interaction with the element yet have the obtrusiveness of the display of the element lessened. Further discussion of this instance may be found beginning in relation to FIG. 5 and corresponding procedures.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ the display environment techniques described herein. The illustrated environment 100 includes a computing device 102 having a processing system 104 and a computer-readable storage medium that is illustrated as a memory 106 although other confirmations are also contemplated as further described below.

The computing device 102 may be configured in a variety of ways. For example, a computing device may be configured as a computer that is capable of communicating over a network, such as a desktop computer, a mobile station, an entertainment appliance, a set-top box communicatively coupled to a display device, a wireless phone, a game console, and so forth. Thus, the computing device 102 may range from full resource devices with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers utilized by a business to perform operations such as by a web service, a remote control and set-top box combination, an image capture device and a game console configured to capture gestures, and so on.

The computing device 102 is further illustrated as including an operating system 108. The operating system 108 is configured to abstract underlying functionality of the computing device 102 to applications 110 that are executable on the computing device 102. For example, the operating system 108 may abstract the processing system 104, memory 106, display devices 112, 114, network, and other functionality of the computing device 102 such that the applications 110 may be written without knowing "how" this underlying functionality is implemented. The application 110, for instance, may provide data to the operating system 108 to be rendered and displayed by the display devices 112, 114 without understanding how this rendering will be performed. The operating system 108 may also represent a variety of other functionality, such as to manage a file system and user interface that is navigable by a user of the computing device 102.

The operating system 108 is also illustrated as including a user experience module 116 which is representative of functionality of the computing device 102 to manage a display environment. The display environment, for instance, may be configured for implementation on a single display device, two display devices 112, 114 as illustrated, or even more display devices. The user experience module 116 may provide a variety of functionality as part of the display environment, such as functionality involving a shared edge.

The user experience module 116, for instance, may examine data that describes an arrangement of the display devices 112, 114, such as data specified through configuration settings of the operating system 108. A variety of different arrangements may be described, such as the side-by-side arrangement as illustrated in FIGS. 1-9 and well as a variety of other arrangements as shown in FIGS. 10-19.

From this described arrangement, the user experience module 116 may determine a shared edge between the display devices, such as an edge through which a cursor may be navigated from one display device 112 to another display device 114. This shared edge may then be used to support a variety of functionality in the display environment, such as to output an element in the user interface, e.g., a menu, to "dock" an application, and so on. To support interaction with the shared edge, the user experience module 116 may configure the display environment in a variety of ways, a first example of which may be found in relation to FIG. 2.

Generally, any of the functions described herein can be implemented using software, firmware, hardware (e.g., fixed logic circuitry), or a combination of these implementations. The terms "module," "functionality," and "engine" as used herein generally represent software, firmware, hardware, or a combination thereof. In the case of a software implementation, the module, functionality, or engine represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Figure 2:
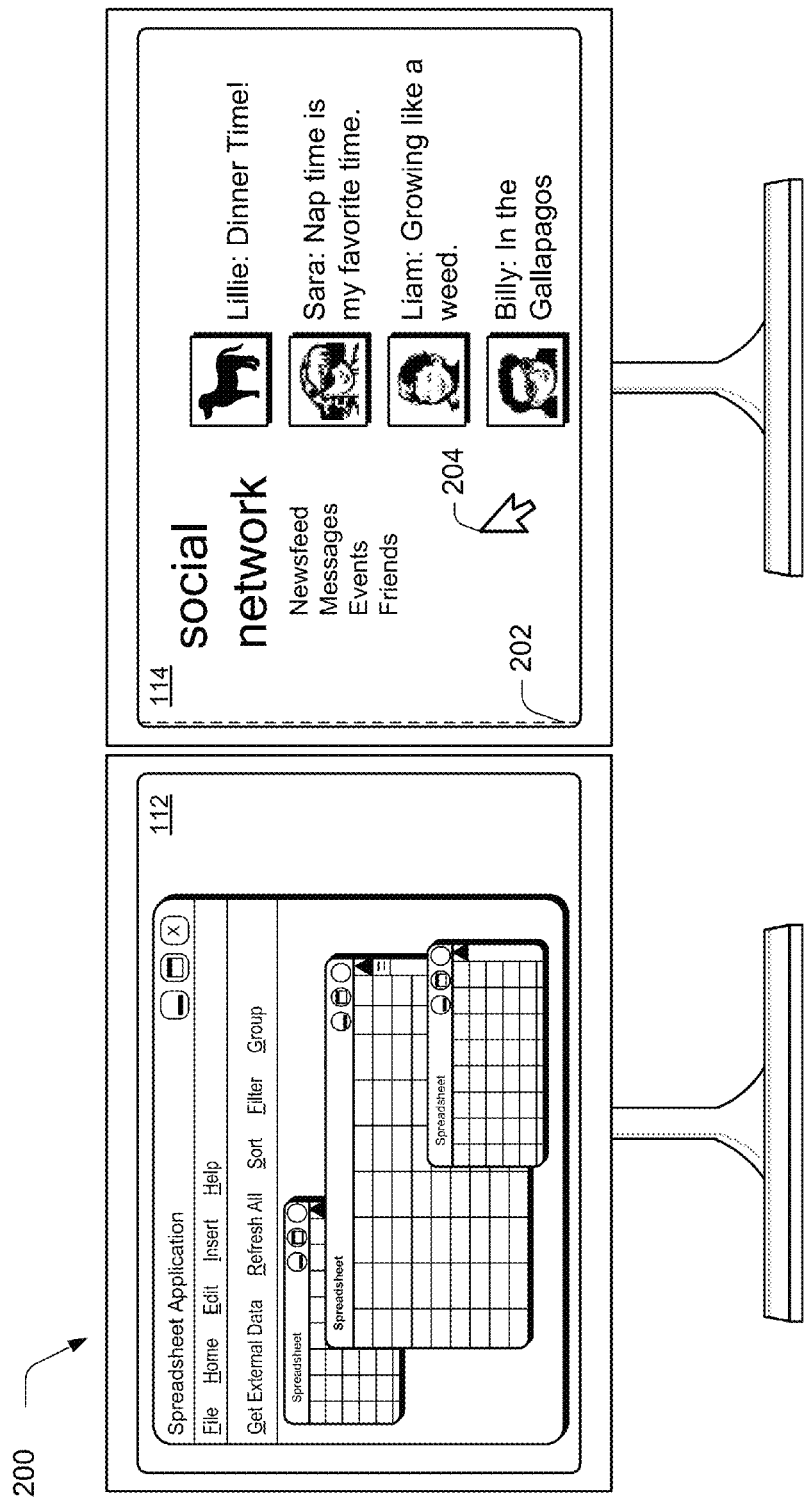
FIG. 2 is an illustration of a system in an example implementation of a computing device of FIG. 1 as employing a plurality of display devices to display a plurality of shells of an operating system simultaneously.

FIG. 2 illustrates a system 200 in an example implementation of the computing device 102 of FIG. 1 as employed a plurality of display devices to display a display environment to support shared-edge interaction. The system 200 includes the first and second display devices 112, 114 of the computing device 102 of FIG. 1. The first display device 112 is illustrated as displaying a spreadsheet application while the second display device 114 is illustrated as displaying a social network application.

A shared edge 202 is illustrated through use of a phantom line on the display device 114. As described previously, this shared edge may be determined through configuration settings to identify which edges of the respective display devices are to be positioned adjacent to each other to support the display environment. Thus, although a shared edge is not shown for display device 112 for sake of simplicity in the figure this device may also include a defined shared edge.

In the illustrated example, the shared edge 202 is defined as a portion that is positioned along a left edge of the display device 114. Interaction with the shared edge 202 may be used to support a variety of different functionality, such as involving elements in a user interface which may include docking an application, output of an element, and so on. An example of this is shown in the next figure.

Figure 3:
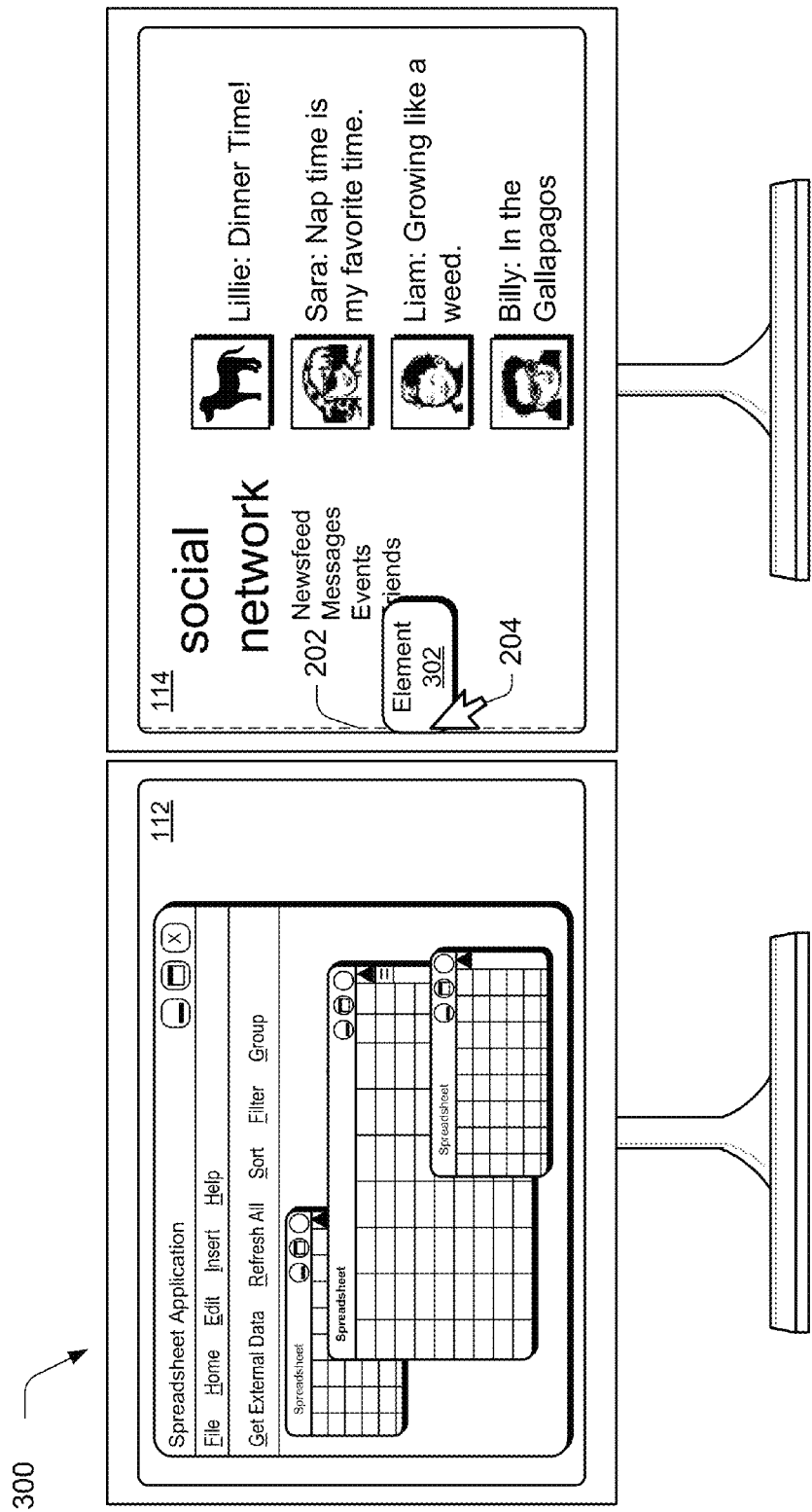
FIG. 3 depicts a system in an example implementation in which an element is output responsive to placement of a cursor proximal to a shared edge of a display device.

FIG. 3 depicts a system 300 in an example implementation in which an element is output responsive to placement of a cursor proximal to a shared edge of a display device. In this example, a user has used a cursor control device (e.g., mouse, track pad, pointer, and so on) to provide an input to cause the cursor 204 to be positioned at the shared edge 202 of the display device 114. This causes an element 302 to be output. The element, for instance, may be configured as a pop-up menu including an indication to a user, an option that is selectable to initiate an action by the user, usable to cause an action to be performed (e.g., docking of a window of an application), and so on.

Thus, the shared edge 204 that is defined to be positioned in a display environment "between" output of data in the display devices 112, 114 may be utilized to support a variety of different functionality. Further, the user experience module 116 may be configured to support a variety of functionality to aide a user in interaction with the shared edge 202, a first example of which may be found in relation to the following figure.

Figure 4:
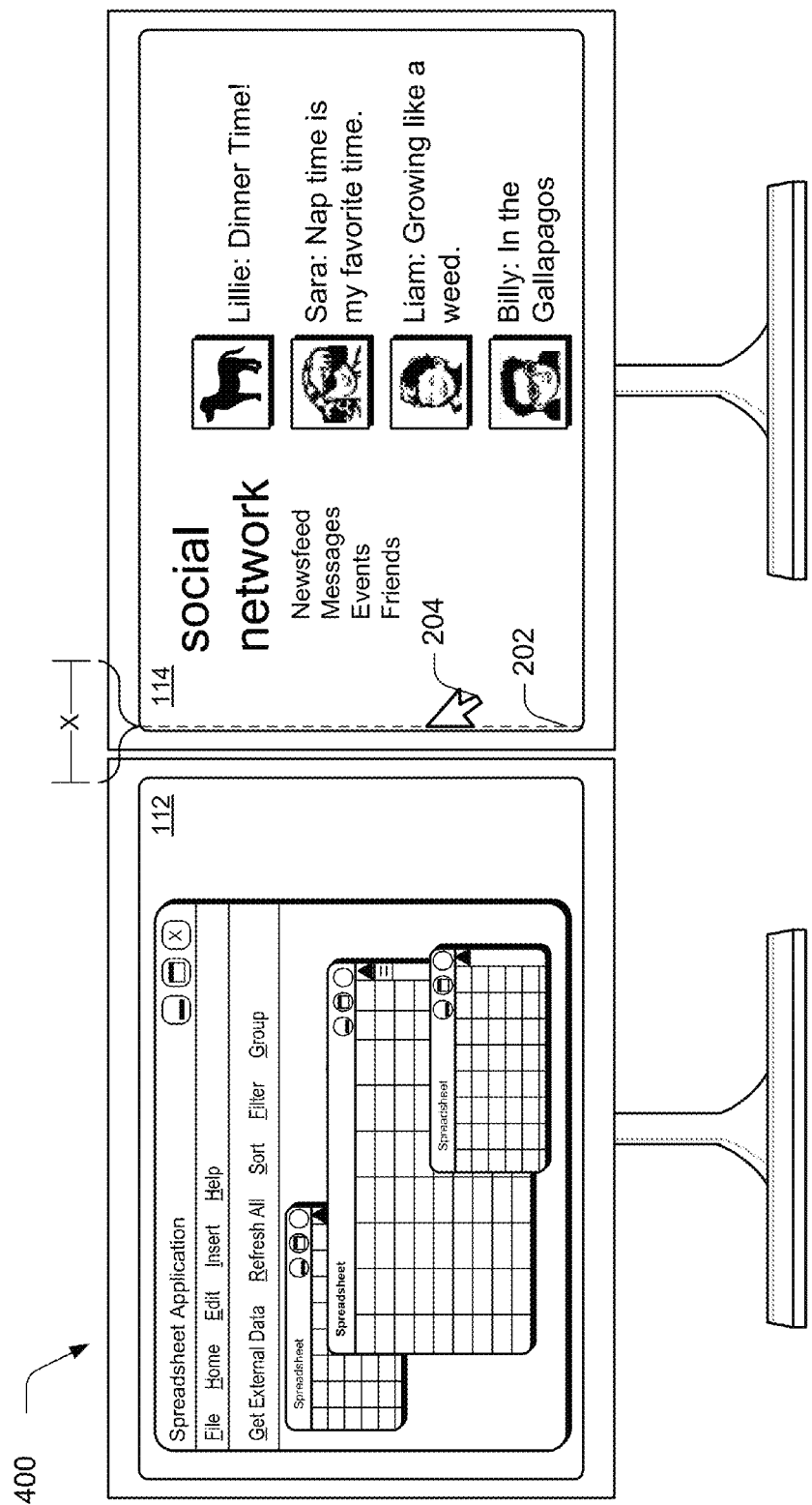
FIG. 4 depicts a system in an example implementation in which rates are used to aide interaction with a shared edge of a display environment.

FIG. 4 depicts a system 400 in an example implementation in which rates are used to aide interaction with a shared edge of a display environment. Like before, the shared edge 202 may include a portion that is configured to support different functionality, such as output of the element 302 in FIG. 3. This portion may be configured to have a variety of widths, from a single pixel to a plurality of pixels. Regardless, in this example the shared edge 202 is configured to employ a rate to "slow down" movement at (e.g., "within") and/or near the shared edge 202.

For example, the cursor 204 may move according to a defined rate, e.g., for movement of a cursor control device by "n" amount a display of the cursor 204 is moved by "m" amount. At a portion defined by the shared edge 202, however, a slower rate may be used to move the cursor 204. A rate, for instance, may be defined such that a single pixel width that is used to define the shared edge 202 is treated as "X" number of pixels, e.g., fifty pixels. Therefore, navigation through the shared edge 202 is slower than navigation outside the shared edge 202, thereby easing user interaction with the shared edge 202.

In one or more implementations, a change in direction back toward a location at which the navigation originated that caused "entry" into the shared edge 202 (i.e., away from the shared edge 202) may cause use of the other rate. In other words, this reversal in direction may signal to the user experience module 116 that interaction with the shared edge 202 is not desired and therefore the "fine tuning" supported by the slower rate associated with the shared edge 202 is not used.

The rate associated with the shared edge 202 may be set in a variety of ways. For example, the user experience module 116 may cease movement of the cursor 204 while "in" the portion of the shared edge 202, e.g., the "X" number of pixels defined for the rate of movement. Further, this movement may be defined for a specific axis, e.g., for an axis that is perpendicular to the shared edge 202. For instance, in the illustrated example, the "X" amount of pixels may be defined for a horizontal axis but not the vertical axis. Thus, in this instance display of the cursor 204 may be performed while reducing jitter during movement.

Therefore, adjustment of the rate of movement associated with the cursor 204 in relation to the shared edge 202 may be used to support a variety of interactions. In one example, movement of a display of the cursor 204 is ceased while "in" the shared edge 202. Slowed movement of the cursor 204 may also be supported. Thus, a user may use this slowed movement to interact with the shared edge 202, such as to output an element in the user interface (e.g., a menu), support docking of applications, and so on. Techniques may also be supported that do not (but may) involve adjustment of rate in relation to the shared edge 202, an example of which may be found in relation to the following figure.

Figure 5:
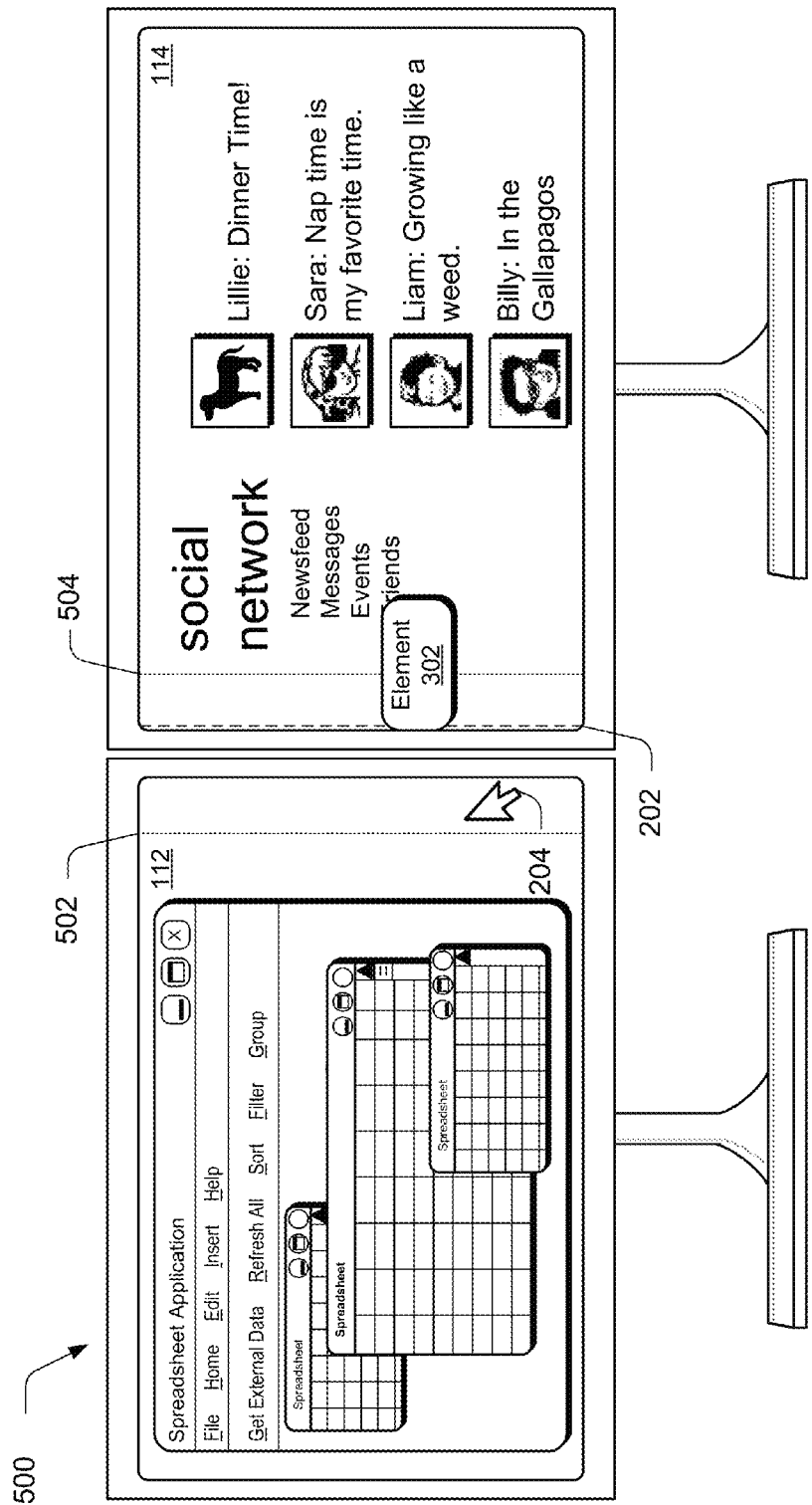
FIG. 5 depicts a system in an example implementation showing a shared edge and one or more gates that may be used to aide interaction with the shared edge.

FIG. 5 depicts a system 500 in an example implementation showing a shared edge 202 and one or more gates 502, 504 that may be used to aide interaction with the shared edge 202. In this example, the cursor 204 has been navigated past the shared edge 202, which causes output of an element 302. However, in this example the cursor 204 has not passed a gate 502 disposed "beyond" that direction in navigation of the cursor. Therefore, a display of the element 302 remains on the display device 114.

In this way, the shared edge 202 and the gate 502 define a region in the display environment in which the cursor may be moved and keep the element 302 displayed. Another gate 504 disposed on an opposing side of the shared edge 202 from the gate 502 may further define a permissible region for movement that supports continued output of the element 302.

In one or more implementations, a threshold is used in conjunction with the portion of the shared edge 202 to manage output of the element 302 by the user experience module 116. For example, the threshold may define a speed of movement of the cursor 202 through the display environment. At speeds above the threshold (e.g., at the shared edge 202), the user experience module 116 may leverage this information to determine that output of the element 302 is not desired by the user and therefore prevent output of the element 302. On the other hand, speeds below this threshold amount may indicate a likelihood that a user does desire to interact with the shared edge 202 and therefor the user experience module 116 may enable this functionality to output the element 302. Thus, the threshold may be used to reduce inadvertent output of the element 302 and therefore promote "cleanliness" of the user interface. A user may then "exit" from display of the element 302 as shown in the following figure.

Figure 6:
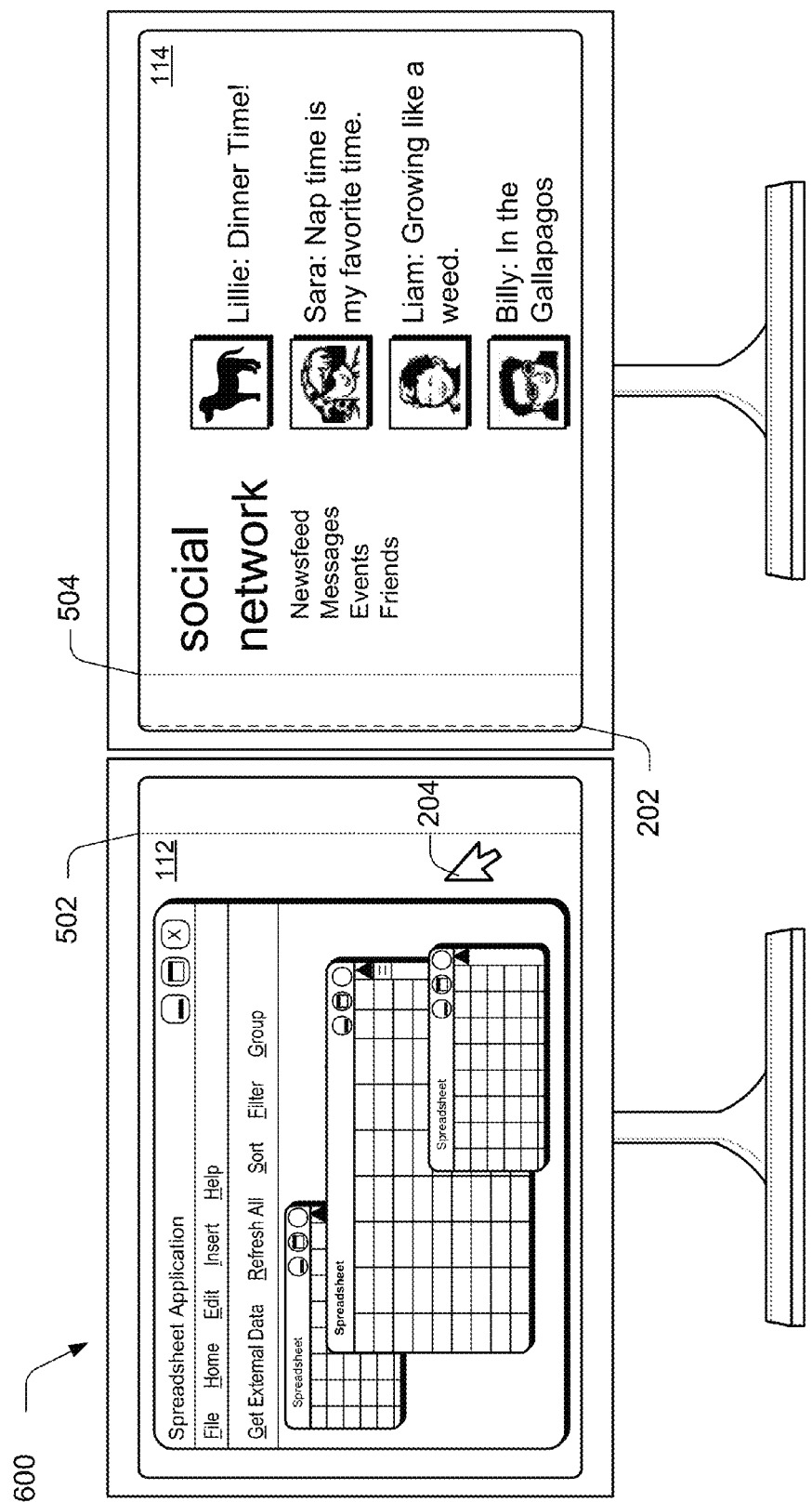
FIG. 6 depicts a system in an example implementation in which display of the element in FIG. 5 ceases responsive to movement of the cursor past a gate.

FIG. 6 depicts a system 600 in an example implementation in which display of the element 302 in FIG. 5 ceases responsive to movement of the cursor past a gate 502. Continuing with the previous example, a user may cause the cursor 204 to navigate through the shared edge 202 to trigger output of the element 302. Responsive to subsequent navigation through either one of the gates 502, 504, the user experience module 116 may cause display of the element 302 to cease.

Thus, the gates 502, 504 and the shared edge 202 may define a region through which movement of the cursor 204 is permissible and support a mechanism to efficiently navigate away from the element 302. In one or more implementations, a timeout value may also be used to cause display of the element 302 to stop after a defined amount of time.

Figure 7:
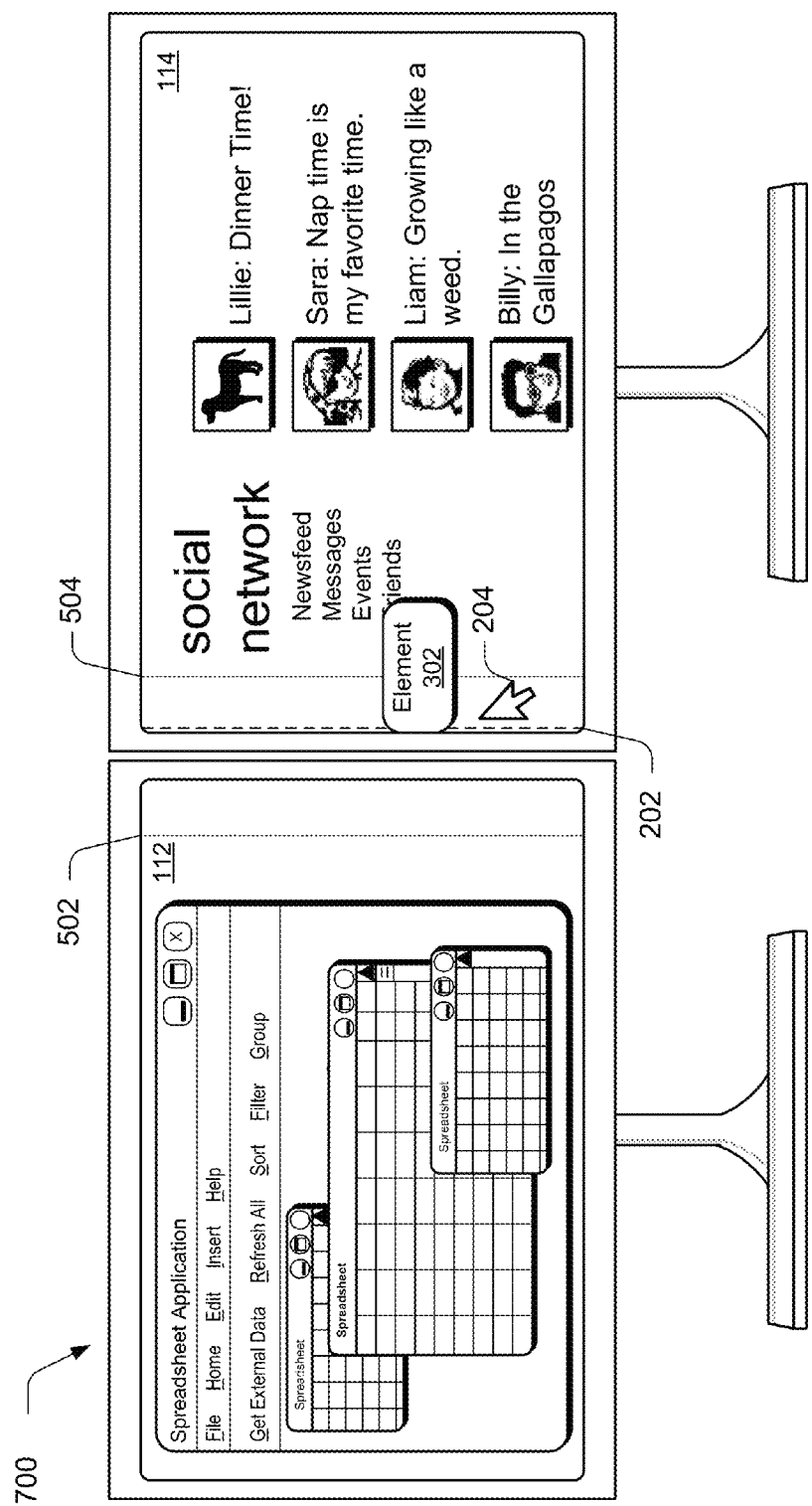
FIG. 7 depicts a system in an example implementation in which a user navigates to an element in a display environment.

FIG. 7 depicts a system 700 in an example implementation in which a user navigates to an element in a display environment. In this example, the cursor 204 has been moved through at least a portion of the shared edge 202, thereby causing the element 302 to be displayed. This may be performed from either direction, e.g., from display device 114 to display device 112 or vice versa. A user may then navigate to the element 302 through the region defined by the gates 502, 504 to interact with the element 302 as described in relation to the following figure.

In another example, the design may be configured to work in a single direction. For example, the shared edge 202 may be configured to output the element when navigating from display device 114 to display device 112, e.g., "to the left," but not when navigating from display device 112 to display device 112, e.g., "to the right" in the illustrated example. A variety of other examples are also contemplated.

Figure 8:
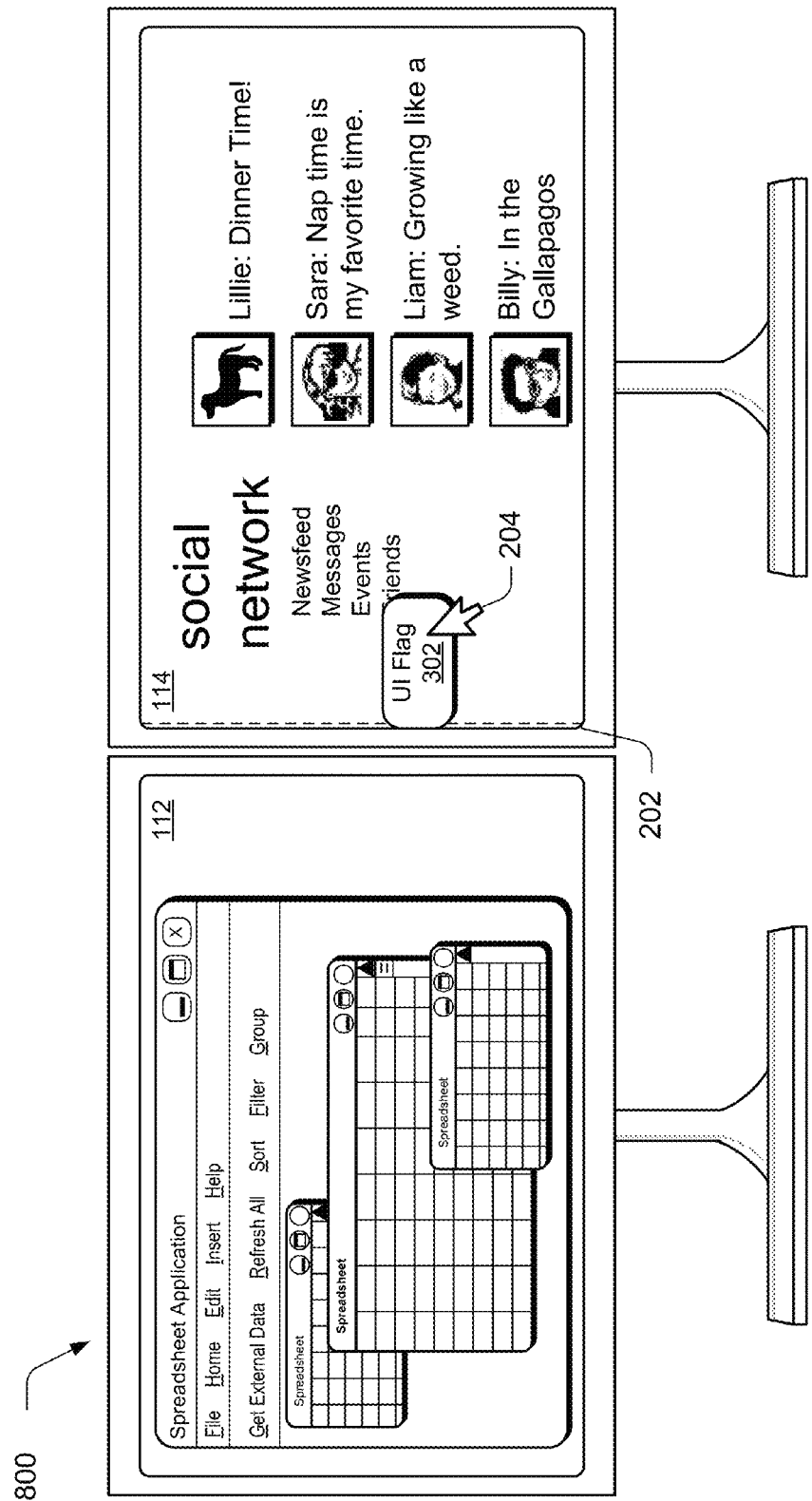
FIG. 8 depicts a system in an example implementation in which a user has navigated to an element to interact with the element.

FIG. 8 depicts a system 800 in an example implementation in which a user has navigated to an element 302 to interact with the element 302. In this example, the cursor 204 has been moved to within a defined boundary of the element 302. In response, the user experience module 116 has removed the gates 502, 504 of FIG. 7 that define a region for permissible navigation of the cursor 204.

Consequently, navigation of the cursor outside of a boundary of the element 302 may cause the user experience module 116 to cease display of the element 302. Thus, in this example, navigation within the boundary of the element 302 is supported, even in portions that lie "outside" of the gates 502, 504. Navigation outside of the boundary of the element 302 may be used to remove display of the element 302. Therefore, navigation to and/or through a portion of the shared edge 302 may be used to support a variety of functionality. Further navigation to and/or through different parts of the shared edge may be used to interact with different functionality, an example of which is described in relation to the following figure.

Figure 9:
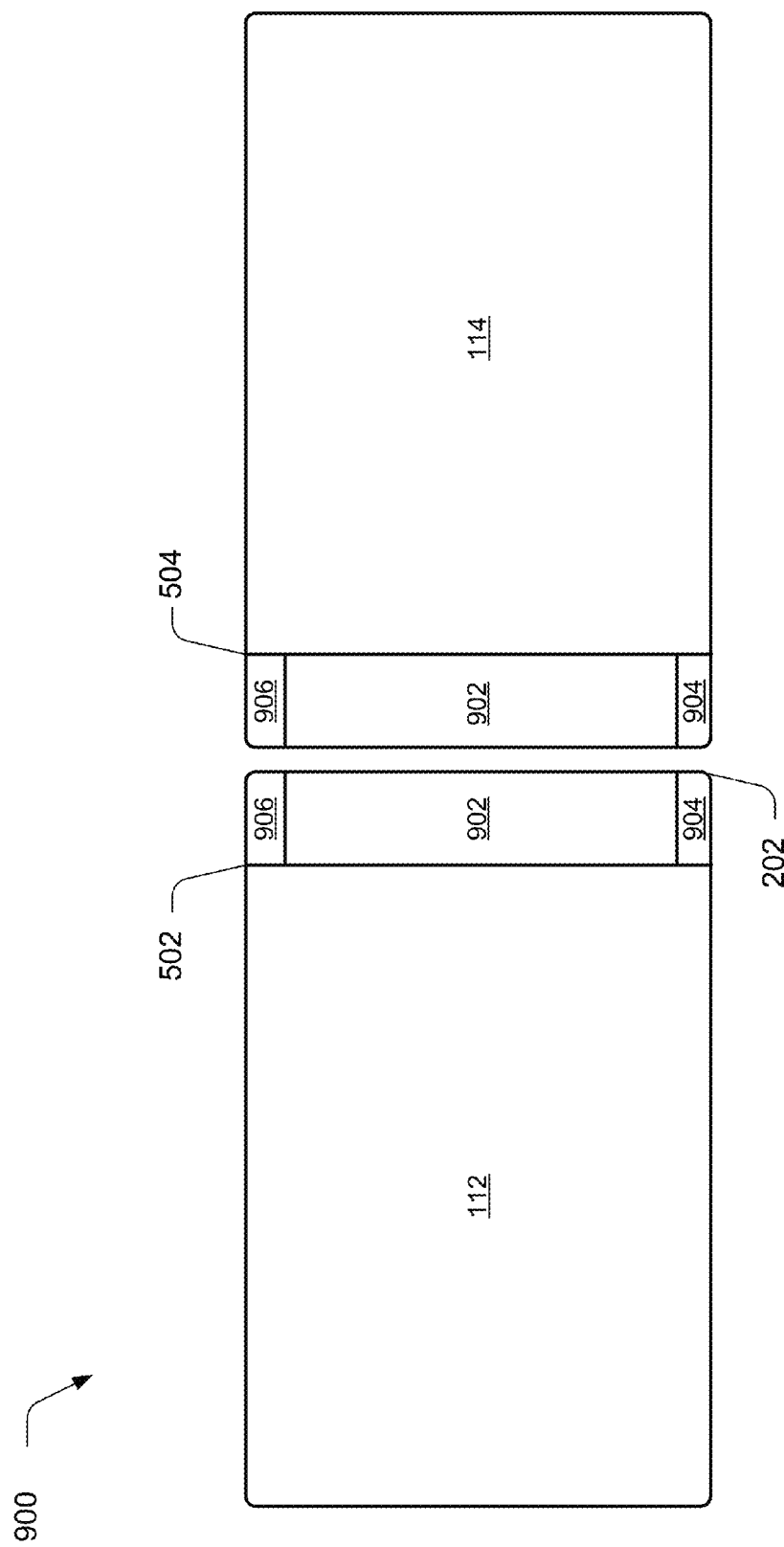
FIG. 9 depicts a system in an example implementation in which different portions associated with a shared edge are utilized to interact with different functionality.
Figure 10:
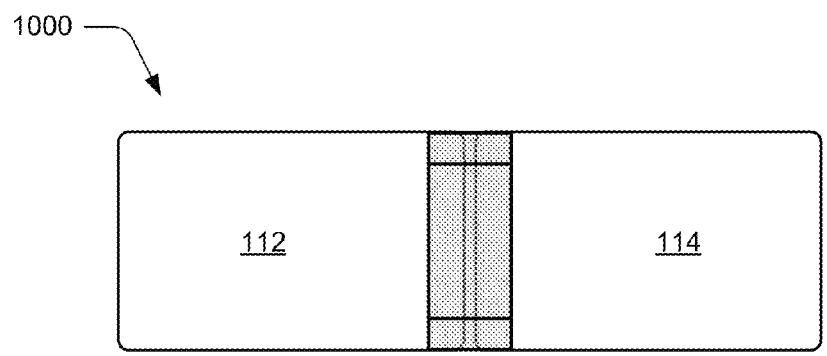
FIGS. 10-19 depict systems in example implementations showing different arrangements of display devices that may be used to implement a display environment as described herein.
Figure 11:
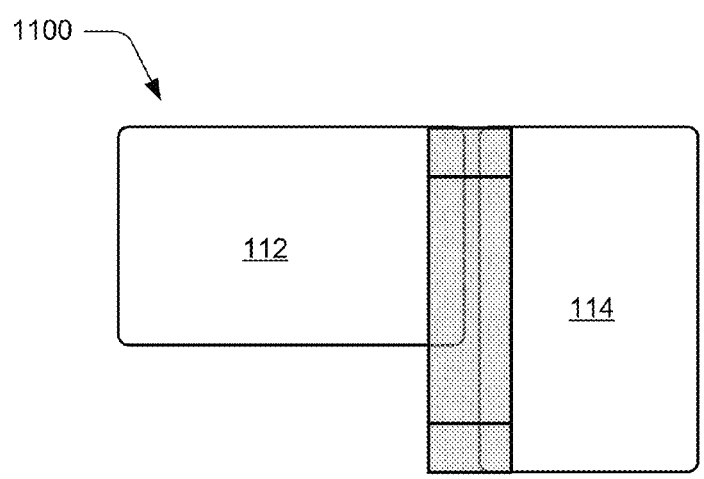
Figure 12:
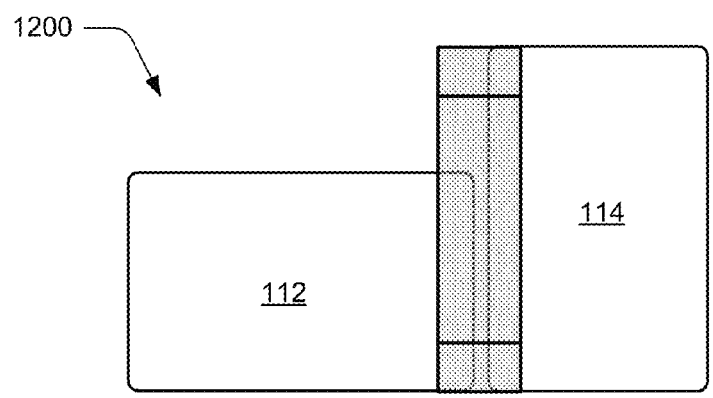
Figure 13:
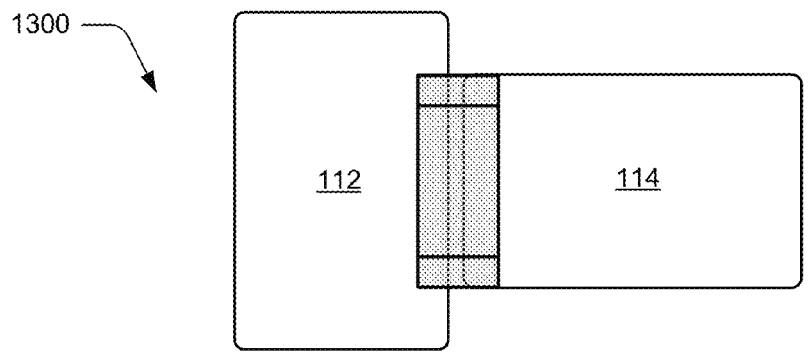
Figure 14:
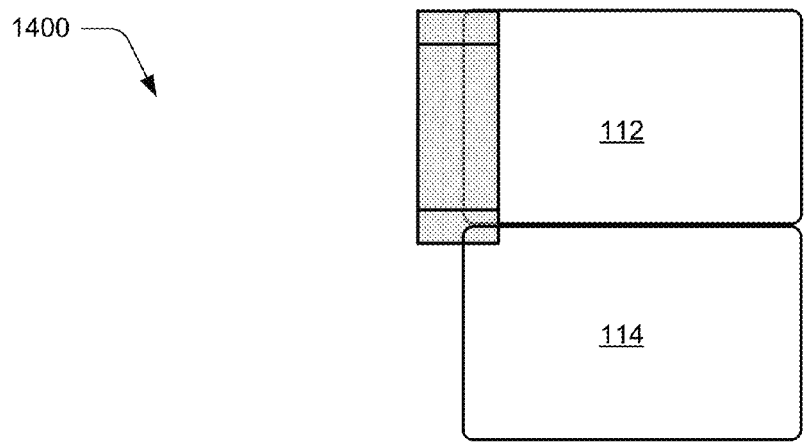
Figure 15:
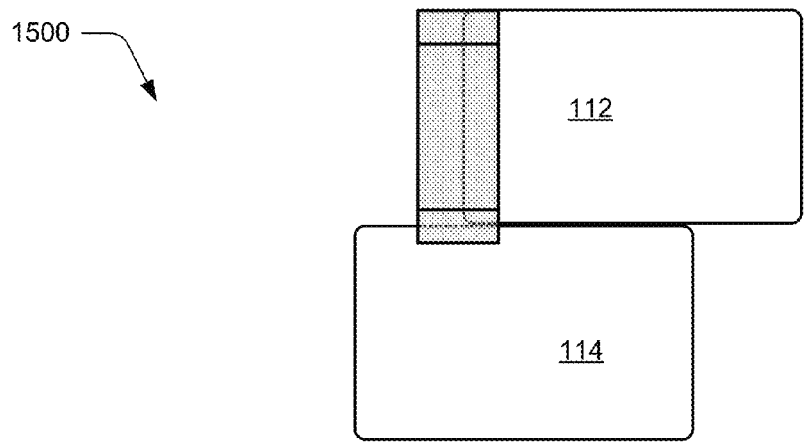
Figure 16:
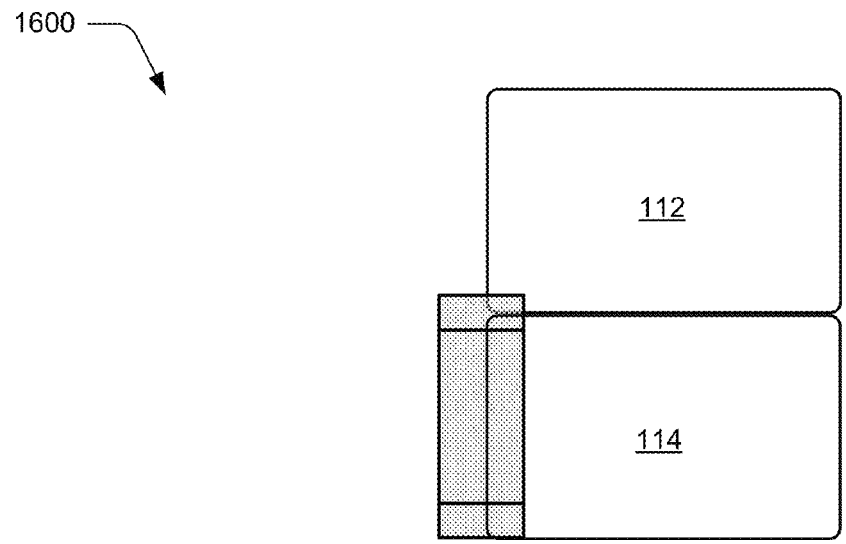
Figure 17:
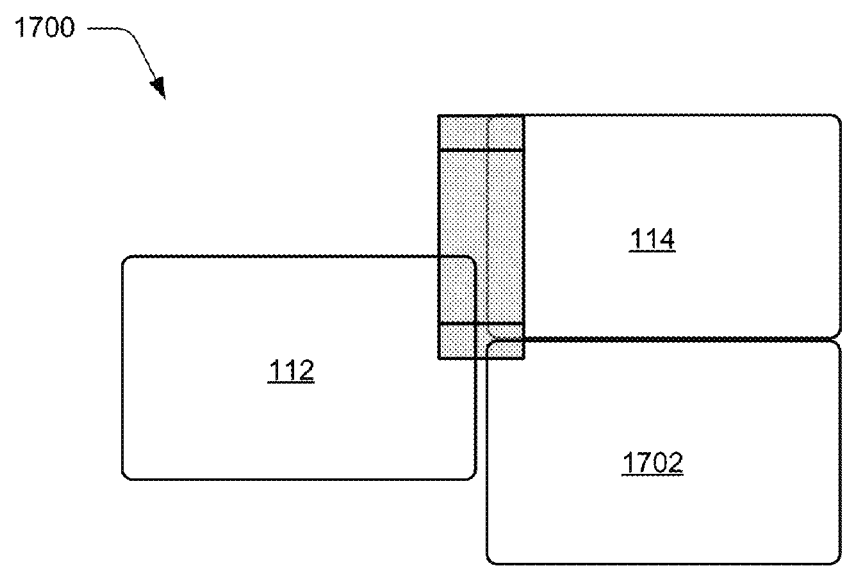
Figure 18:
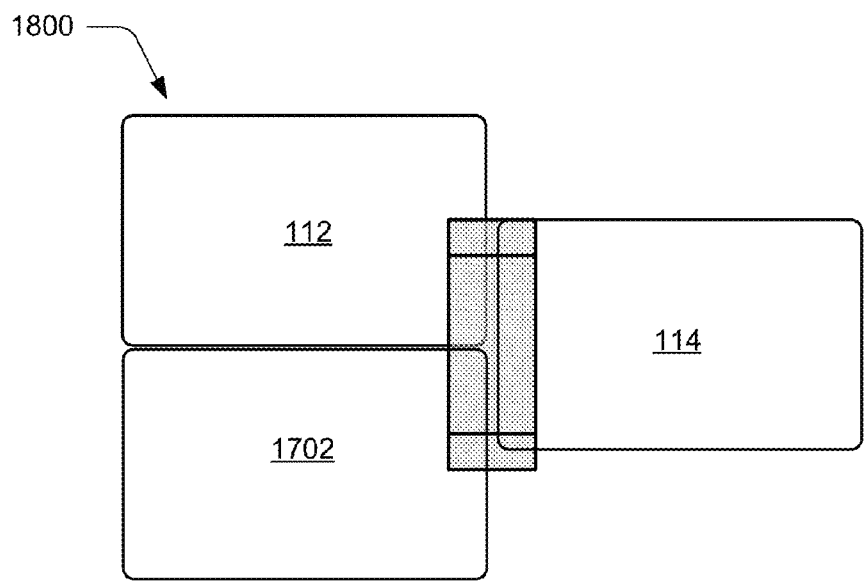
Figure 19:
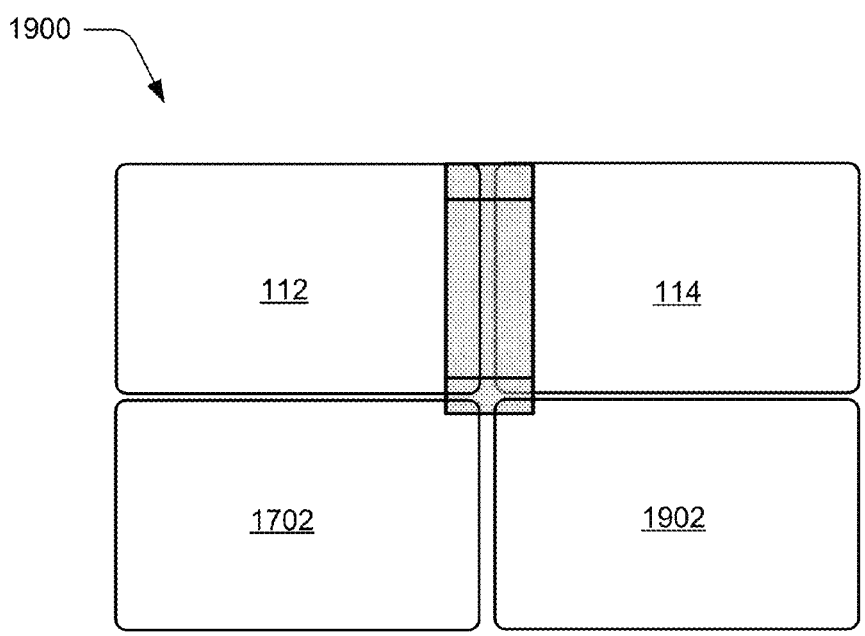

FIG. 9 depicts a system 900 in an example implementation in which different portions associated with a shared edge are utilized to interact with different functionality. In this example, three regions 902, 904, 906 are shown. In the first region 902, an element of a user interface may be invoked between the shared edge and gates 502, 504 as previously described in relation to FIGS. 5-8. Thus, this region defines a portion of the shared edge 202 that may be used to cause display of the element 302, such as for a menu related to an application that is displayed on either of the display devices 112, 114.

A second region 904 is defined below the first portion 902 in the illustrated example. Interaction with the second region 904 may be used to output another element in the user interface that is different from the element 302 output for the first region. For example, this region may be used to output a launch menu of commands, e.g., system UI or "charms" that provide representations of applications that are selectable to navigate to and/or launch the represented application.

Further, interaction with the shared edge 902 of the second region 904 may be configured to support interaction that is different from interaction supported at the shared edge 202 of the first region 902. This portion of the shared edge 902, for instance, may be configured such that a cursor 204 is not permitted to pass through the edge. Thus, the cursor 204 may be efficiently "caught" by the region 904 to cause output of an element or other functionality. Additionally, this behavior may also be avoided by simply navigating the cursor 204 outside of this region, such as "up and over" the second region 904 through the first region 902. Therefore, inadvertent output of functionality of the second region may be corrected by a user in an unobtrusive manner.

A third region 906 is also illustrated as positioned above the first region 902. In a first implementation, this region is configured to be "empty" and therefore may avoid output of the element 302 when crossing the shared edge 202 as would otherwise be performed when passing through the portion of the shared edge 202 in the first region. In other implementations, however, yet another element may be output that is different that the first and/or second regions 902, 904, may provide additional functionality, and so on.

Thus, a variety of different functionality may be supported in the display environment through interaction with different portions of the shared edge 202. Although a side-by-side arrangement of the display devices is shown, a variety of other arrangements may also be supported.

As illustrated in the example systems 1000, 1100, 1200, 1300, 1400, 1500, 1600, 1700, 1800, and 1900 of FIGS. 10-19, respectively, a variety of different arrangements and numbers of display devices 112, 114, 1702, and 1902 may be used to implement the display environment. The first region is illustrated in the example systems 1000-1900 using cross hatching that slants down to the left and the second and third regions are illustrated in the example systems 1000-1900 using cross hatching that slants down to the right. Thus, it should be readily apparent that a variety of different arrangements of display devices may be described and utilized to define a shared edge to implement the functionality described herein, further discussion of which may be found in relation to the following procedures.

Example Procedures

The following discussion describes display environment techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the systems 200-1900 of FIGS. 2-19, respectively.

Figure 20:
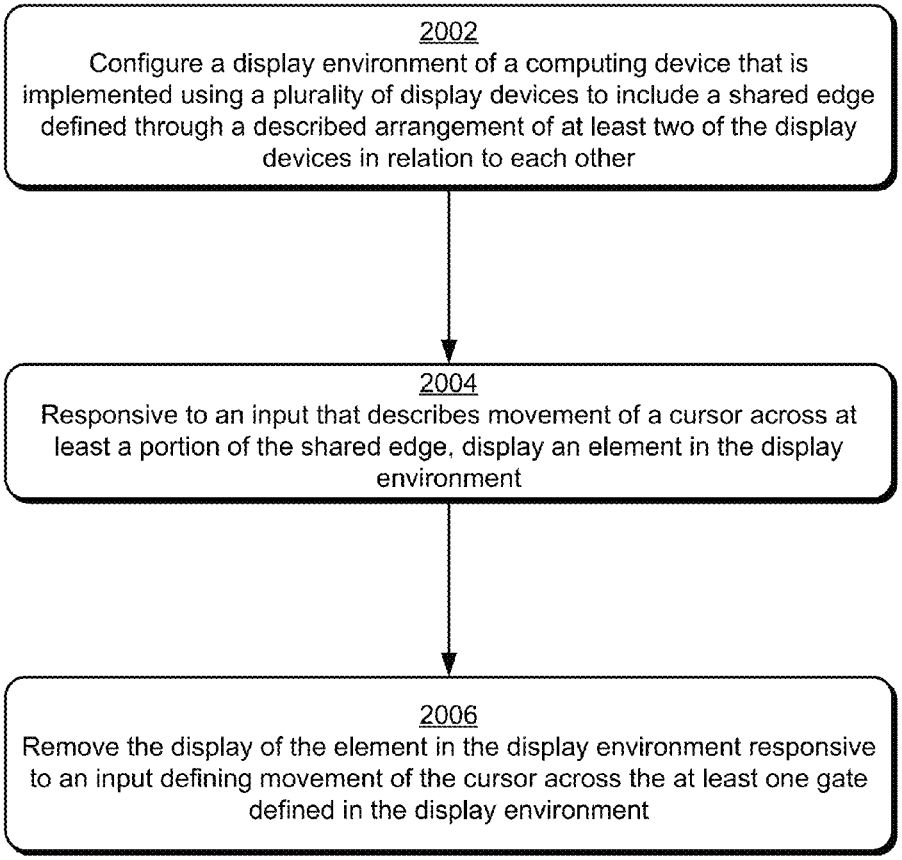
FIG. 20 is a flow diagram depicting a procedure in an example implementation in which movement of a cursor through a shared edge is used to cause display of an element in a user interface.

FIG. 20 depicts a procedure 2000 in an example implementation in which movement of a cursor through a shared edge is used to cause display of an element in a user interface. A display environment of a computing device that is implemented using a plurality of display devices is configured to include a shared edge defined through a described arrangement of at least two of the display devices in relation to each other (block 2002). The arrangement of the display devices, for instance, may be defined through configuration settings of the operating system 108, applications 110 that are executable by the computing device 102, and so on.

Responsive to an input that describes movement of a cursor across at least a portion of the shared edge, an element is displayed in the display environment (block 2004). A user, for instance, may interact with a cursor control device (e.g., mouse, track pad, pointer, and so on) to provide an input to cause the cursor 204 to move through at least a portion of the shared edge 202. The user experience module 116 may then detect this movement and cause output of an element in the display environment, such as to output a menu, dock a window of an application, and so forth.

The display of the element in the display environment is removed responsive to an input defining movement of the cursor across at least one gate defined in the display environment (block 2006). The gate 502, for instance, may be defined to be substantially parallel to the shared edge 202 although other shapes are also contemplated, such as curved and so on. Movement past that gate which causes the cursor 204 to exit a region defined by the gate 502 and the shared edge 202 and/or another gate 504. Thus, a region 902 may be defined through which movement of the cursor 204 is permitted to retain display of an element, the display of which was triggered through movement through the shared edge 202. Another example of shared edge implementation in a display environment that includes a plurality of display devices may be found in relation to the following figure.

Figure 21:
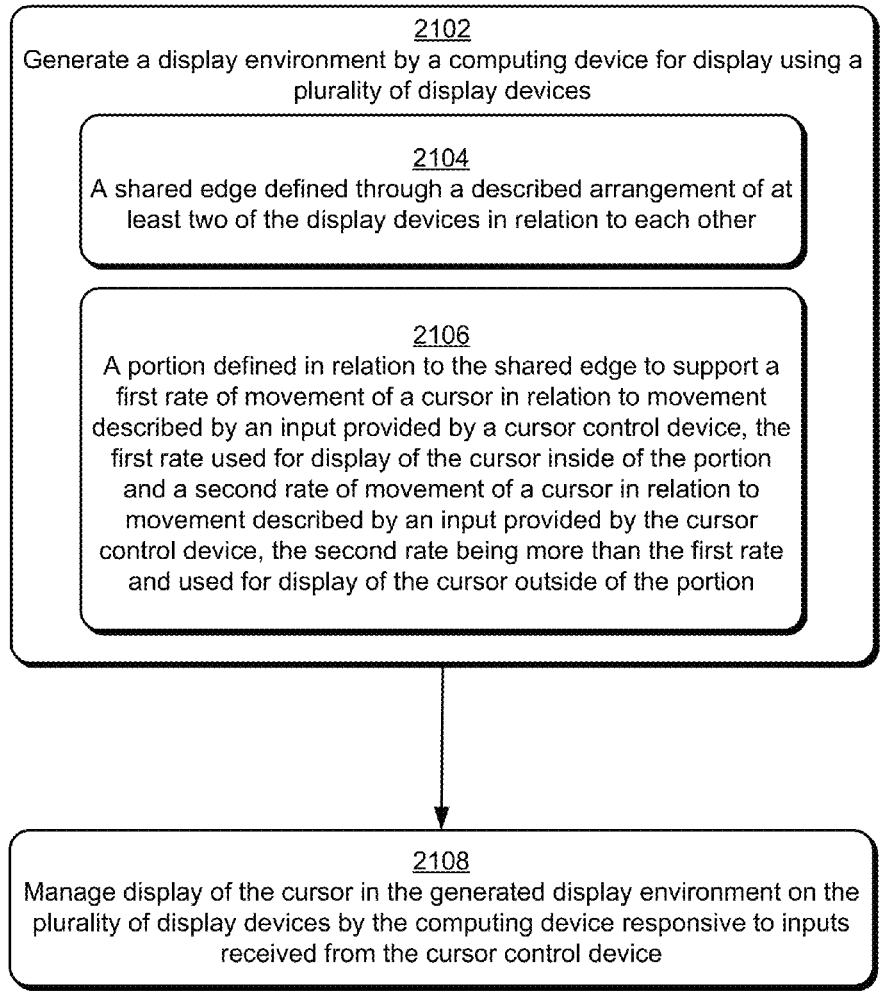
FIG. 21 is a flow diagram depicting a procedure in an example implementation in which different rates of movement are utilized for a cursor in respect to a shared edge of a display environment.

FIG. 21 depicts a procedure 2000 in an example implementation in which different rates of movement are utilized for a cursor in respect to a shared edge of a display environment. A display environment is generated by a computing device for display using a plurality of display devices (block 2102). The display environment includes a shared edge defined through a described arrangement of at least two of the display devices in relation to each other (block 2104). The display environment also includes a portion defined in relation to the shared edge to support a first rate of movement of a cursor in relation to movement described by an input provided by a cursor control device, the first rate used for display of the cursor inside of the portion. The portion defined in relation to the shared edge is also usable support a second rate of movement of a cursor in relation to movement described by an input provided by the cursor control device, the second rate being more than the first rate and used for display of the cursor outside of the portion (block 2106). The shared edge 202, for instance, may thus be used to define a rate of movement associated with the shared edge itself as well as a rate to be used to movement of the cursor 204 outside of the shared edge 202 as described in relation to FIG. 4.

Display of the cursor in the generated display environment on the plurality of display devices is managed by the computing device responsive to inputs received from the cursor control device (block 2108). The user experience module 116, for instance, may determine "where" the cursor 204 is to be displayed in the display environment based on inputs received from a cursor control device and apply a rate associated with the location, e.g., whether at the shared edge 202 or elsewhere in this example. A variety of other examples are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A computing device comprising:
    a processor; and
    a user experience module configured to, by the processor:
        configure a display environment of the computing device that is implemented using a plurality of display devices to include a shared edge defined through an arrangement of at least two of the display devices in relation to each other, the display environment including a cursor;
        upon determining that a received input causes the cursor to move across at least a portion of the shared edge, initiate the display of a visual element in the display environment in addition to the cursor, wherein the visual element was not previously displayed prior to the cursor moving across at least the portion of the shared edge; and
        continue display of the visual element in the display environment responsive to a determination that (i) an additional input has caused subsequent movement of the cursor and (ii) that after the subsequent movement of the cursor, the cursor remains between the shared edge and at least one gate.

2. The computing device of claim 1, wherein the subsequent movement includes at least one additional movement of the cursor across the shared edge.

3. The computing device of claim 1, wherein the user experience module is further configured to remove the display of the visual element in the display environment responsive to an input defining movement of the cursor across the at least one gate defined in the display environment.

4. The computing device of claim 3, wherein the user experience module is further configured such that the element is displayable throughout movement of the cursor within the visual element that is outside the at least one gate.

5. The computing device of claim 4, wherein the user experience module is further configured such that subsequent movement of the cursor from within the visual element to outside a display of the visual element causes the display of the visual element to cease.

6. The computing device of claim 1, wherein the user experience module is further configured to:
initiate display of the visual element responsive to a determination that the cursor is moving at a rate that is below a threshold; and
not initiate display of the visual element responsive to a determination that the cursor is moving at a rate that is above the threshold.

7. The computing device of claim 1, wherein the user experience module is further configured to configure the display environment to include a second portion of the shared edge through which movement of the cursor between the at least two display devices is prevented.

8. The computing device of claim 7, wherein the visual element is a first visual element, and wherein the user experience module is further configured to display another visual element that is different from the first visual element when an input is received that causes the cursor to interact with the second portion of the shared edge.

9. The computing device of claim 1, wherein the visual element is a menu.

10. The computing device of claim 9, wherein the menu includes an option that is user selectable to cause an action to be performed by the computing device.

11. The computing device of claim 1, wherein the arrangement is defined through configuration settings of the computing device.

12. A method comprising:
generating a display environment by a computing device for display using a plurality of display devices, the display environment including:
a shared edge defined through an arrangement of at least two of the display devices in relation to each other; and
a portion defined in relation to the shared edge to support:
a first rate of movement of a cursor described by an input provided by a cursor control device, the first rate used for display of the cursor inside of the portion;
a second rate of movement of the cursor described by an input provided by the cursor control device, the second rate being greater than the first rate and used for display of the cursor outside of the portion; and
managing display of the cursor in the generated display environment on the plurality of display devices by the computing device responsive to inputs received from the cursor control device.

13. A method as described in claim 12, wherein the portion is defined such that responsive to detection that a direction of the input of the cursor inside the portion has changed, the second rate of movement is used by the computing device for the cursor.

14. A method as described in claim 12, wherein the first rate is defined such that a display of the cursor in the portion is not moved until movement of the cursor control device over a threshold amount is detected.

15. A method as described in claim 14, wherein responsive to detection that the movement is over the threshold amount, the cursor is displayed outside of the portion.

16. A computing device comprising:
one or more processors; and
one or more computer readable storage media comprising instructions stored thereon that, in response to execution by the computing device, cause the computing device to configure a display environment of an operating system executed by the computing device for implementation by a plurality of display devices, the display environment including a shared edge defined through a described arrangement specified in settings of the operating system of at least two of the display devices in relation to each other, the operating system configured to cause display of a menu responsive to receipt of an input to cause a cursor to move across at least a portion of the shared edge and to remove the display of the menu in the display environment responsive to an input defining movement of the cursor across at least one gate defined in the display environment.

17. The computing device of claim 16, wherein the operating system is configured to remove the display of the menu in the display environment responsive to an input defining movement of the cursor across at least one gate defined in the display environment.

18. The computing device of claim 16, wherein the operating system is configured to continue display of the menu in the display environment responsive to a determination that an input that describes subsequent movement of the cursor is to remain between the shared edge and at least one gate.

19. The computing device of claim 16, wherein the operating system is configured to:
display the menu responsive to a determination that the input describes movement at a rate that is below a threshold; and
not display the menu responsive to a determination that the input describes movement at a rate that is above the threshold.

* * * * *